May 14, 1929. F. W. POWERS ET AL 1,712,841
TWO-TEMPERATURE THERMOSTAT
Filed April 23, 1927
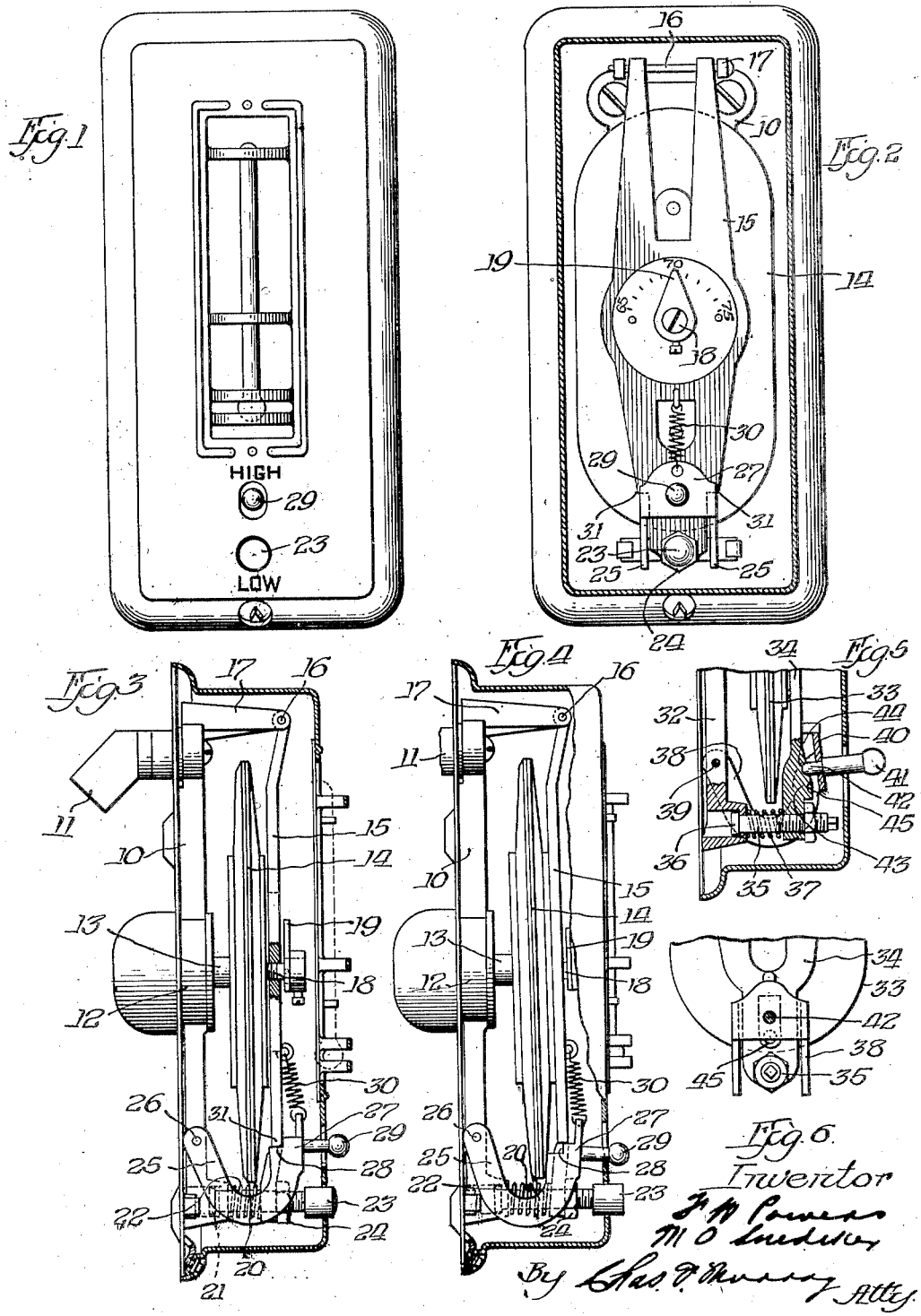

Patented May 14, 1929.

1,712,841

UNITED STATES PATENT OFFICE.

FRED W. POWERS AND MORTON O. SNEDIKER, OF CHICAGO, ILLINOIS, ASSIGNORS TO POWERS REGULATOR COMPANY, OF CHICAGO, ILLINOIS, A CORPORATION OF ILLINOIS.

TWO-TEMPERATURE THERMOSTAT.

Application filed April 23, 1927. Serial No. 185,981.

Our invention relates to thermostatic control devices and particularly to a novel instrument adapted for simple manipulation to effect control of temperatures within two ranges.

It has been found to be advantageous and desirable in numerous instances where the heating of the rooms of a building is regulated by thermostatic devices, to provide means of some character for reducing the temperature of a room during a period when it is not to be occupied. Numerous devices have been suggested for the accomplishment of this result, all without any noticeable degree of success. We are aware, also that it is common to provide means operable in each room for completely interrupting the action of the thermostat and permitting no heat during an inactive period; but this is undesirable for numerous reasons, one of the foremost of which is that in cold weather the room will become unduly chilled and will require too long a time to reach normal temperature when heat is subsequently supplied.

By our invention we provide an instrument operable by a single movement to effect control of the temperature at two pre-determined points. For example, at 50 and 70 degrees, the device being so arranged that the occupant cannot, without special tools, gain access to the instrument to effect a change in either of the ranges of adjustment. In one type of instrument, illustrated herein, we have provided for the accomplishment of the desired result by the actuation of one of two buttons or projections; in the other instrument, the result is accomplished by the actuation of a single button. The fundamental elements of the device are a heat controlling instrumentality such as a valve, electric contact, etc., a thermostat acting on said heat controlling element, an abutment or support for the thermostatic element, and manually operated means for moving the abutment between two pre-determined points or stops. The positioning of the abutment at one point will effect thermostatic control of the heat to maintain a high range of temperature, and the other point of adjustment will effect heat control at the low range of temperature.

The invention will be more readily understood by reference to the accompanying drawing, in which;

Fig. 1 is a face view of an instrument constructed in accordance with our invention;

Fig. 2 is a similar view with the casing or housing removed;

Fig. 3 is a side elevation partly in section, showing the parts in one position of adjustment;

Fig. 4 is a similar view showing the parts in another position of adjustment;

Fig. 5 is a fragmentary sectional view showing a modified form of the device; and Fig. 6 is a fragmentary face view of the parts shown in Fig. 5.

In the drawings, it will be seen that we provide a base or wall member, 10, having the usual pipe connections, 11. The device illustrated is adapted for use with air control and this involves the use of a controlling valve, indicated generally at 12, the valve stem being shown at 13. A self-contained thermostatic element or wafer is indicated at 14, the same being supported on the side opposite the point of contact with the plunger, 13, by means of an abutment member in the form of an arm, 15. This arm has a pivotal connection at 16 with a bracket 17 rigid with the base, 10. As a means for providing a point of contact between the wafer and the arm, 15, we provide the screw, 18, to which a finger or pointer 19 is attached. The screw is threaded into the arm, and provides means for effecting regulable temperature control.

The free end of the arm, 15, has a threaded aperture to receive a screw threaded plunger, 20, having a head, 21 that occupies an undercut recess in the base, 10. An expansion spring 22 is located between the base and the free end of the arm, and urges the same outwardly. By turning the screw by grasping the button, 23, the preliminary or coarse adjustment of the instrument is effected. After such adjustment, the set nut, 24 is tightened. By the means just described, it will be seen that the outward movement of the arm is fixed, the plunger head, 21 serving as a limit stop.

As a means for providing two temperature control, we provide a pivoted yoke having a pair of arms, 25, pivoted at 26 to the base, the yoke terminating in a head, 27 having a notch 28 therein. A button, 29 projects from the head to enable actuation of the yoke. A tension spring, 30 is connected to the head and to the arm, 15 and tends to swing the yoke upwardly.

The distance between the notch 28 and the pivot 26 serves to determine the low temperature limit of adjustment of the instrument. In other words this distance will be determined by trial, so that the desired low temperature will be maintained, when the instrument is in that position of adjustment. Thereafter, any change in the low temperature adjustment must be made by action of the so-called high temperature adjusting screw 18. As shown in Fig. 4 by exerting a downward pressure on the button, 29, the yoke is caused to oscillate until the notch is moved out of engagement with the projection, 31 on the arm 15, thus permitting the spring, 22 to force the arm to its outward limit as determined by the plunger 20. In this position, the device will operate to maintain a predetermined high temperature, the temperature being determined by the adjustment theretofore effected. When the low range of temperature is desired, the button, 23, is pressed, thus serving to compress the spring 20 and to swing the arm 15 inwardly. When the compression is sufficient to permit the spring 30 to pull the yoke into the locking position, shown in Fig. 3, the instrument will then be set for maintaining the low temperature adjustment.

In the construction shown in Figs. 5 and 6, the base, 32, wafer, 33, arm, 34, plunger, 35, plunger head 36 and spring, 37, remain the same as in the preceding figure. The yoke arms, 38 are pivoted at 39 and have a cross piece 40 which carries a button, 41. A projection, 42, having a rounded end, is provided as an extension on the button element, 41. The lower end 43 of the arm, 34 is provided with a pair of depressions, 44, 45, located in different planes, the depressions constituting in effect a cam surface. Oscillation of the yoke through the medium of the button will serve to position the projection 42 in one or the other of the depressions, thereby serving to position the arm, 34, in its inner or outer positions.

A cover, 46, the same in both forms illustrated, serves to securely inclose the mechanism and the adjusting devices, with the exception of the buttons, thus preventing tampering with predetermined temperature adjustments.

By the use of this mechanism, it will be seen that a room occupant may, by a single movement, change the temperature control from a high or low level, without being able to vary the limits established for either temperature.

We claim:

1. In a thermostatic regulator, the combination of a heat controlling member, thermostatic element for actuating said heat controlling member, an abutment support for the thermostatic element, adjustment means on the abutment for varying the effective distance between the thermostatic element and the abutment, and other means, operable by a single motion, for shifting the position of the abutment, and adjustment means to effect a predetermined low temperature adjustment.

2. In a thermostatic regulator, the combination of a heat controlling member, a thermostatic element for actuating said heat controlling member, means providing limit stops, one of which is adjustable, means for effecting high temperature adjustment between the abutment and the thermostatic element, and means for effecting movement of the abutment between the said limit stops whereby to provide for predetermined high or low temperature levels without changing the predetermined high temperature adjustment.

3. In a thermostatic regulator, the combination of a heat controlling member, a thermostatic element for actuating said heat controlling member, means providing limit stops, one of which is adjustable, means for effecting high temperature adjustment between the abutment and the thermostatic element, means for effecting movement of the abutment between the said limit stops whereby to provide for predetermined high or low temperature levels without changing the predetermined high temperature adjustment, and a casing for enclosing the entire device except the means for effecting movement of the abutment between its stops.

4. In combination, a base and a valve having a stem mounted thereon, a thermostatic wafer mounted for contact with the stem, an arm for supporting the wafer, means for adjusting the extent of separation of the arm and wafer to effect high temperature adjustment, and means operable by a single motion for effecting movement of the arm between predetermined limits whereby to change the adjustment to effect desired high or low temperatures without change in the high temperature adjusting means.

5. In a thermostatic regulator, a combination of a heat controlling member, a thermostatic element for actuating said heat controlling member, a pivoted abutment for the thermostatic element, screw means for varying the effective distance between the pivoted abutment and the thermostatic element, and means operable by a single motion for oscillating said abutment between pre-determined stops for effecting pre-determined high and low temperature adjustments without changing said means for varying the effective distance between said thermostat and abutment.

In testimony whereof we have affixed our signatures.

FRED W. POWERS.
MORTON O. SNEDIKER.